United States Patent
Meller et al.

(10) Patent No.: US 9,126,341 B1
(45) Date of Patent: Sep. 8, 2015

(54) PREDICTIVE MAINTENANCE AND INFERRING PATTERNS OF SOLAR PANEL CLEANING SYSTEMS

(71) Applicant: ECOPPIA SCIENTIFIC, LTD., Tel Aviv (IL)

(72) Inventors: Moshe Meller, Tel Aviv (IL); Eran Meller, Tel Aviv (IL)

(73) Assignee: Ecoppia Scientific, Ltd., Tel Aviv (IL)

( * ) Notice: Subject to any disclaimer, the term of this patent is extended or adjusted under 35 U.S.C. 154(b) by 0 days.

(21) Appl. No.: 14/322,657

(22) Filed: Jul. 2, 2014

(51) Int. Cl.
  *B25J 11/00* (2006.01)
(52) U.S. Cl.
  CPC ............ *B25J 11/0085* (2013.01); *Y10S 901/01* (2013.01)
(58) Field of Classification Search
  CPC .......... B25J 11/0085; B25J 5/00; B25J 5/005; B25J 9/00; B25J 9/0084; B25J 9/16; B25J 9/1656; B25J 9/1674; B25J 9/1679
  USPC ......................................................... 700/248
  See application file for complete search history.

(56) References Cited

U.S. PATENT DOCUMENTS

| | | | | |
|---|---|---|---|---|
| 8,046,101 | B2 * | 10/2011 | Hisatani et al. ............... | 700/248 |
| 8,500,918 | B1 * | 8/2013 | Meller et al. ................. | 134/56 R |
| 8,771,432 | B2 * | 7/2014 | Meller et al. ................. | 134/56 R |
| 9,020,636 | B2 * | 4/2015 | Tadayon ........................ | 700/247 |
| 2014/0337086 | A1 * | 11/2014 | Asenjo et al. ................ | 705/7.28 |

* cited by examiner

*Primary Examiner* — Nicholas Kiswanto
(74) *Attorney, Agent, or Firm* — Brown Rudnick LLP

(57) ABSTRACT

System and method to predict maintenance windows, initiate and avoid cleaning cycles of robotic systems that clean solar panels. Using learning algorithms, the system and method is based on collecting, monitoring and conducting trend analysis from data received by the various robotic systems that effect the cleaning cycles, external sensors, sources and feeds.

17 Claims, 2 Drawing Sheets

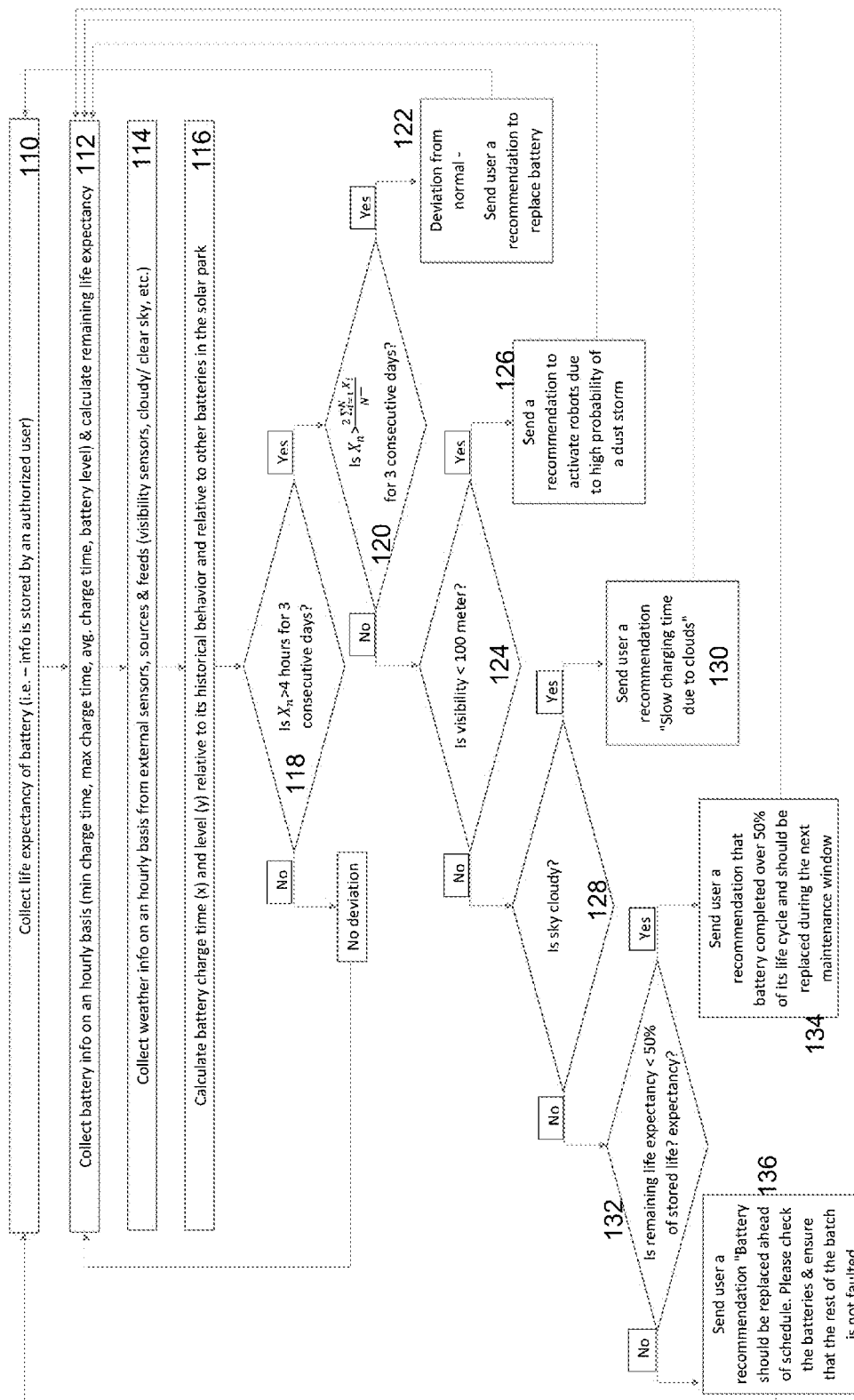

PREDICTIVE MAINTENANCE AND INFERRING PATTERNS OF SOLAR PANEL CLEANING SYSTEMS

FIELD OF INVENTION

The present invention relates generally to analyzing the behavior of solar panel cleaning systems, and particularly to methods and systems for evaluating the need for maintenance windows and optimal cleaning time intervals and frequencies in view of environmental factors that affect the cleaning systems.

BACKGROUND OF THE INVENTION

Solar panel surfaces are made of high quality glass and the efficiency of the renewable energy they generate depends, among other things, on the cleanliness of the glass surfaces. Due to dust on the solar panels, energy losses can reach over forty percent (40%). Solar panels are often concentrated together in areas with abundant sunshine and such concentrations of solar panels are often referred to as solar parks. As most solar parks are located in desert areas where the sun radiation is intensive and the exposure to dusty conditions is high, cleaning the solar panels becomes essential.

In order to minimize maintenance costs and maximize reliability, it would be beneficial for solar park utilities that deploy robotic systems to conduct cleaning of the solar panels to determine the optimal time for the solar panel cleaning as well as maintenance of the various parts of the solar panel cleaning systems. These parts include automation components, robots, transmission belts, batteries and other components known to those skilled in the field to which this invention pertains.

SUMMARY OF THE INVENTION

A method for controlling a cleaning cycle of a robotic system that cleans solar panels in accordance with the invention includes collecting operational data about the robotic system, collecting environmental data relating to an area of the solar panels, e.g., from various environmental sensors in an area of the solar panels and/or directly from weather sources such as established weather providing channels of information that themselves use weather sensors, and determining a recommendation for control of the robotic system based on the collected operational data and the collected environmental data, using a processor. The recommendation is output to one or more authorized users, e.g., via the Internet and one or more communications networks. The recommendation may include initiating an unscheduled cleaning cycle by the robotic system of the solar panels, terminating a pre-scheduled cleaning cycle by the robotic system of the solar panels, adjusting a pre-scheduled cleaning cycle by the robotic system of the solar panels, providing an explanation of operational performance of the robotic system that deviates from normal, directing replacement of a component of the robotic system ahead of schedule and directing replacement of a component of the robotic system during its next, scheduled maintenance.

Another method for controlling maintenance or a cleaning cycle of a plurality of robotic systems that clean solar panels in a common solar park includes obtaining operational data about each of the robotic systems using sensors associated with the robotic systems, obtaining environmental data relating to an area of the solar park using environmental sensors (which would be applicable to all of the solar panels), collecting the operational data and environmental data at periodic intervals and for each collection of operational data and environmental data at a periodic interval, determining whether a component of each robotic system is experiencing an operational deviation for a predetermined period of time using a processor. The operational data and environmental data may be collected at different locations and forwarded to a server including a processor.

If the component of one robotic system is experiencing an operational deviation for a predetermined period of time, a determination is made whether the same component of other robotic systems is experiencing the same operational deviation (a comparative operational performance analysis). If not, i.e., only one component of the robotic system is experiencing an operational deviation, a recommendation may be output to an authorized user that the component of the robotic system should be replaced.

Otherwise, when multiple or all of the same components in the robotic systems in the solar park are experiencing the same operational deviation, a determination is made whether an environmental factor is causing the operational deviation and if so, a recommendation is output to the authorized user that changing of the operation of the robotic system should be undertaken. This would be output when there is, for example, a dust storm or cloudy skies that affect the same component of all of the robotic systems, e.g., the charging time of a battery that is charged by solar energy being generated by the solar panels being cleaned by the robotic system is increased beyond the normal charging time.

Otherwise, if an environmental factor is not the cause of the operational deviation, a recommendation is output to the authorized user that the component of the robotic system should be replaced before a scheduled replacement if the remaining life expectancy of the component is less than a threshold of stored life expectancy of the component.

A system for controlling a cleaning cycle of a robotic system that cleans solar panels in accordance with the invention includes a master control unit that collecting operational data about the robotic system, and a server coupled to the master control unit and that obtains environmental data relating to an area of the solar panels and determines a recommendation for control of the robotic system based on the operational data collected by the master control unit and the obtained environmental data. The server then outputs the recommendation to one or more authorized users. The recommendation may be as described above.

A method for obtaining a risk profile of one or more components of at least one robotic system that cleans solar panels in accordance with the invention includes collecting operational data about the components using sensors associated with the components or that provide data about operational efficiency of the components, determining a risk profile of end of life of each of the components based on the collected operational data using a processor, and outputting the risk profile to an external system to enable the external system to provide one or more authorized users with a recommendation based on, for example, a trend analysis.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 3 is a flow chart of a method for inferring end of life of a specific battery and, if needed, providing a recommendation for a maintenance window of the battery and/or replacement of the battery.

DETAILED DESCRIPTION OF THE INVENTION

Figure 1:
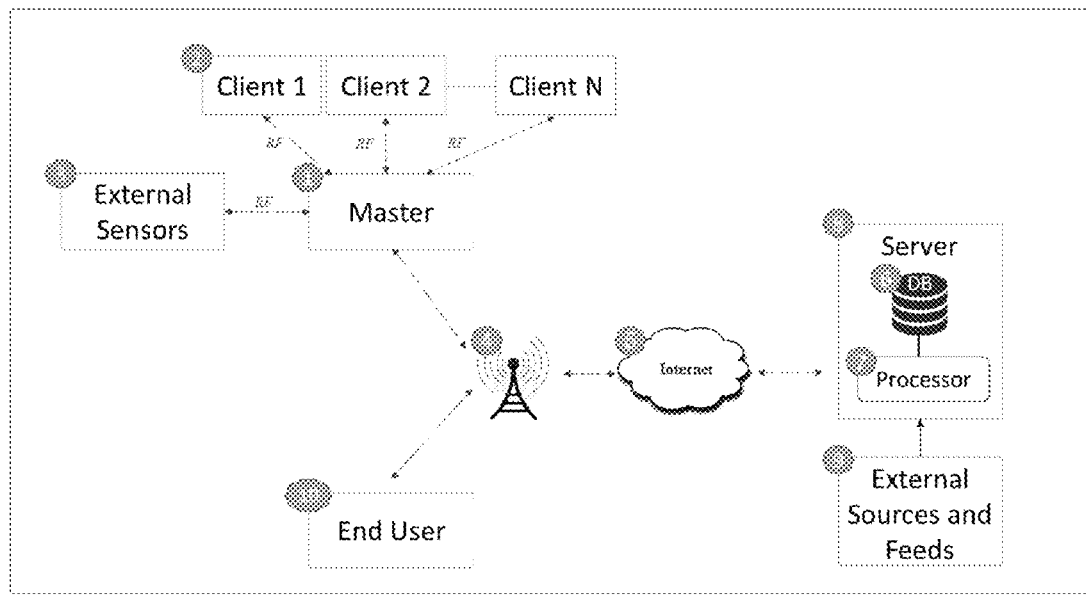
FIG. 1 is a schematic of main components of a system for evaluating the need for maintenance windows and optimal cleaning time intervals and frequencies of a solar panel cleaning system in accordance with an embodiment of the present invention.

Referring to the accompanying drawings, FIG. 1 is a pictorial illustration of a system for collecting, storing, analyzing and evaluating the need for intervention in an existing, scheduled maintenance window and/or cleaning cycle in accordance with an embodiment of the present invention. The system includes a robotic solar panel cleaning system or a plurality or cluster of such robotic solar panel cleaning systems, represented as Client 1, Client 2, ..., Client N and hereinafter referred to as clients. Each robotic solar panel cleaning system includes components that have a service life and wear out after a usually indeterminate period of time.

The system also includes one or more external sensors 3, such as humidity sensors, wind sensors, visibility sensors, rain sensors, and other sensors that provide information about environmental conditions. These external sensors 3 may be configured to monitor real time information. Such external sensors 3 would likely be situated in proximity to the clients 2, i.e., in an area of the solar panels being cleaned by the clients 2, so as to provide location specific data about external conditions that affect the clients 2 and the solar panels they clean. The external sensors 3 may also be connected to the clients 2, e.g., mounted on a frame of the clients 2.

The clients 2 and external sensors 3 communicate with a master control unit 1, usually via an RF communications network. For example, in order to receive and transmit data, each client 2 may communicate with the master control unit 1 via RF in a star topology. The external sensors 3 also transmit the information they obtain or collect via RF to the master control unit 1. Thus, the communications between the external sensors and clients 2 and the master control unit 1, or the transmissions from the external sensors and clients 2 to the master control unit 1, are preferably wireless, although a wired connection may also be used.

The communication links between the clients 2 and external sensors 3, and the master control unit 1 enable the master control unit 1 to receive specific data from the clients 2 and external sensors 3 and individually or collectively activate or deactivate the clients 2, or otherwise control each of the clients 2. Data from the clients 2 is operational data relating to the components obtained from, for example, one or more sensors that monitor the operation of the clients 2 and/or components thereof, which sensors and the manner in which they obtain information is readily ascertainable by those skilled in the art to which this invention pertains.

Of interest, the operational data may include status of a rechargeable battery that provides power to the client 2, charging time of this battery, and the cleaning duration for a charge of the battery. The operational data may also include the number of cleaning cycles which enables condition of each transmission belt of the cleaning system to be approximated.

The master control unit 1 sends raw and/or processed information to a server 8 via at least one antenna 4 and at least one data network 5, such as the Internet. Other techniques to convey information from the master control unit 1 to the server 8 are also within the scope of the invention. Using the information received from the master control unit 1, the server is able to track patterns of individual clients 2 and infer client-specific risk profiles from these patterns, e.g., using trend analysis.

Risk profiles of the end of life of the components of the client 2 may be inferred, e.g., when the component is about to fail and requires replacement in the near term. The risk profiles may be in the form of a data file, message, etc. provided to an end user 10, like or as part of a recommendation. To this end, the server 8 includes appropriate processing hardware and software as would be readily apparent to one skilled in the art to which this invention pertains. This processing hardware includes, for example, a database 6 and a processor 7.

Processor 7 may comprise any suitable sort of computational hardware that is known in the art, and may optionally be supplemented by dedicated or programmable hardware, as well as peripheral components, for carrying out at least some of the functions that are described herein.

Additional to the operational data considered for the purpose of assessing risk profile of end of life of the components of the clients 2, server 8 also analyzes, assesses and potentially recommends adjustment of the cleaning operation of the clients 2. To this end, the server 8 preferably considers various sorts of information, such as wind conditions, visibility, rain, and humidity, additional to that obtained by the external sensors 3. This information is typically obtained from suitable information feeds from other servers such as Accuweather or other commercially available weather information-providing sources (generally shown in FIG. 1 as external sources and feeds 9).

During operation, the server 8 receives the information obtained by the external sensors 3 along with operational input about each client 2 and the components thereof (e.g., battery status, charging time, cleaning duration, number of cleaning cycles, etc.) and stores such information in the database 6. The server 8 also receives location-based information from suitable feeds 9 from other servers regarding current and forecast weather conditions.

Based on the internal and external information received, the server 8 processes and analyzes the data, and when needed or sought, the server 8 provides a recommendation to the authorized end user or end users 10 via the data network 5 such as the Internet and the antenna 4. The recommendation relates to effective maintenance and optimal cleaning times. Recommendations can be directed to the end user 10 in real time.

The recommendations may be in a form of a data file, message and the like, that is generated by the server 8 and directed to the end user 10, e.g., to a personal data assistant (PDA) of the end user 10, via the data network 5 and the antenna 4. The data file can be processed by the PDA of the end user 10 to, for example, display the recommendation on the PDA's display. The data file may also allow for responsive input by the end user 10

Authorized end users 10 can then determine if they want to accept or reject the recommendation and, if needed, the end user 10 can enter commands via the PDA to be directed to the master control unit 1 to effect control over one or more of the clients 2 or a component thereof. The end user 10 uses a user interface of the PDA, and the entered commands may be provided to the master control unit 1 via the antenna 4 (as shown in FIG. 1). Thus, the end user 10 is able to exercise control over the clients 2 by issuing control commands to the master control unit 1 that converts the entered commands into action by the clients 2 to alter their operation.

A recommendation generated by the server 8 can be related to either maintenance or a cleaning cycle, and in both cases, it could trigger an initiation of maintenance or a cleaning cycle, avoid a scheduled maintenance or cleaning cycle, reschedule a scheduled maintenance or cleaning cycle, direct replacement of a component, direct examination of a component or suggest accelerated replacement of a component. The recommendation could either be for a specific client 2 or multiple clients 2, a specific solar park site at which one or more clients 2 are situated or multiple sites at each of which one or more clients 2 are situated.

Some of the recommendations the server 8 initiates are preferably based on patterns derived from multiple sources, e.g., the current status of the clients 2 and their scheduled maintenance and cleaning cycles provided by the clients 2 or the master control unit 1, environmental information provided by the external sensors 3, and additional environmental information obtained from the external sources and feeds 9.

For example, the server 8 can infer a risk profile that is attributed to wind speeds in a specific solar park. In a situation where there is a preprogrammed daily cleaning cycle of a client 2 at 19:00 with a maximum wind speed constraint of 40 km/hr, if the server 8 receives information that between 18:05 to 18:45, wind speeds of 15 to 35 km/hr are present with a positive trend of approximately 5 km/hr every 10 minutes, the server 8 might provide the authorized user 10 a recommendation to avoid (postpone) the upcoming cleaning cycle of client 2 due to a positive trend of the wind speeds that may exceed the predetermined threshold during cleaning.

In other examples, the system analysis by server 8 could lead to initiation of a cleaning cycle of one or more clients 2 as a result of a sudden dust storm. Assuming the server 8 collects data from the visibility sensor (one of external sensors 3) and an external source 9 such as Accuweather and assesses from such data that there is limited visibility, at some point in time, an appropriate recommendation could be to initiate all clients 2 due to a heavy dust storm. The clients 2 would thus clean the solar panels that have been dirtied as a result of the sudden dust storm, provided the end user 10 authorizes such cleaning after receiving the recommendation.

As for predicting life expectancy of the various components of each client 2, the server 8 may derive and store information in the database 6 regarding daily routines, patterns, preferences and personal history of the various clients 2, and update this information in real time as the state of the client 2 changes. The server 8 also receives the end user's responses to recommendations. The server 8 receives, for example, on an hourly basis, the status of the vital system components and can assess life expectancy well in advance. For example, assuming the battery of a client 2 charged itself within 1 hour in month 1, 2 hours in month 2 and n hours in month n. Based on historical performance and pre-determined risk profile and inputs, the server 8 can recommend to replace a specific battery since its effectiveness is being diminished as evidenced by the required increase in charging time. Moreover, if all batteries are charging themselves promptly every morning for approximately the same duration, prior to a scheduled maintenance window, the server 8 can recommend not to replace the batteries. Such an exercise can take place on the engine, belts and many other components of the clients 2.

The evaluated risk profile of each component as well as the recommendations may be also affected by the authorized end user's preferences. For example, if an authorized end user 10 is risk averse and would like to avoid a cleaning cycle if the probability of strong winds exceeds 1%, he could receive more recommendations to avoid a cleaning cycle, compared with more risk-tolerant authorized user. Such profiling could either be pre-determined (i.e., the authorized user provides their risk comfort level in advance) or the server 8 can learn the user's pattern for authorizing maintenance as a function of time and adjust its recommendations accordingly. The server 8 could thus be programmed to account for preferences, responses or lack of responses provided by the end user 10.

Figure 2:
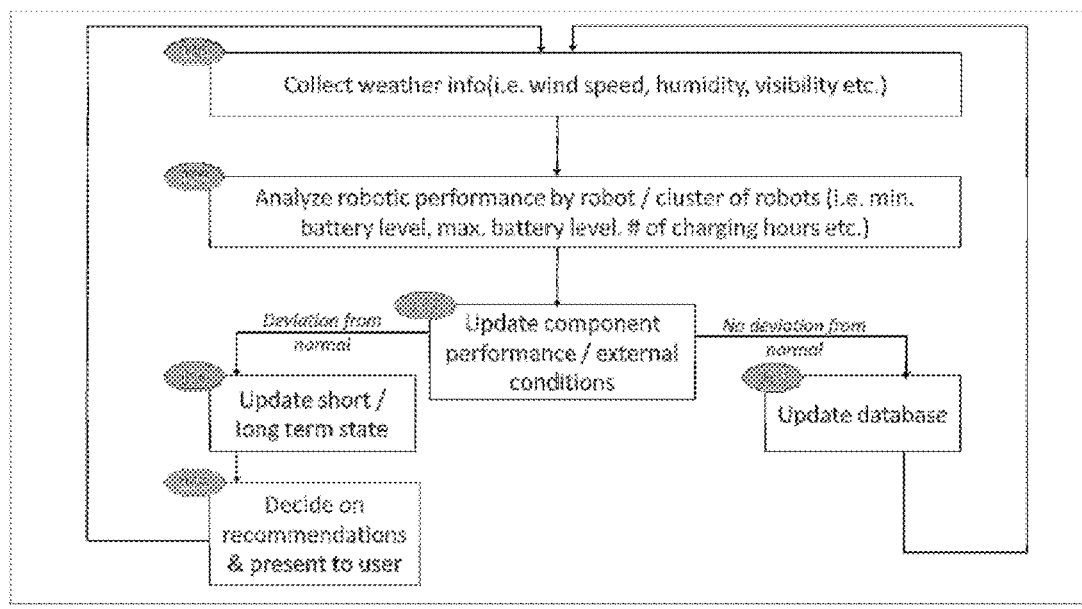
FIG. 2 is a flow chart of an exemplifying, non-limiting method for generating recommendations for control of solar panel cleaning systems.

Referring now to FIG. 2, functionality of a system for evaluating the behavior of the various system components and the need for a maintenance window in accordance with an embodiment of the present invention is illustrated in flow chart form. More specifically, FIG. 2 illustrates a method for inferring the need to activate or deactivate the clients 2 from their pre-determined cleaning schedules, in accordance with an embodiment of the present invention.

In step 100, server 8 collects weather information, such as wind speed, humidity, and visibility via external sensors 3, and from this input, analyzes weather patterns and robotic performance patterns 101 of the various clients 2 in step 101. The performance patterns include, for example, minimum battery level, maximum battery level, the number of hours required to charge the battery, and other operating parameters of components of the clients 2. In step 102, server 8 updates component performance and external conditions, and compares them to historical data or patterns (stored in the database 6).

If there are no deviations from normal, the database 6 may be updated in step 103 and then the process returns to step 100 for further weather information collection.

On the other hand, if there is a deviation from normal, the process infers deviations from standards in step 104 and then decides on one or more recommendations to be directed to the end user 10 in step 105.

FIG. 3 is an exemplifying, non-limiting flow chart of a method for inferring the end of life of a specific battery and, if needed, for recommending a maintenance window and/or replacement of the battery. The method may be performed by the server 8 including processor 7 shown in FIG. 1. The method, and a system that utilizes the method such as the system shown in FIG. 1, is designed to predict the optimal, next step in the maintenance technique based largely on historical patterns.

Generally, once the method and system detect deviations from normal, an attempt is made to analyze whether the deviation is unique for a specific robotic solar panel cleaning system and/or whether it is a deviation common to all robotic solar panel cleaning systems in the same solar park. If all robotic systems in the solar park are deviating from the standard, the problem is, most likely, due to environmental factors in the area of the solar park.

Pattern recognition is a very important feature of a high quality system. Processor 7 therefore executes a pattern recognition algorithm stored in, for example, database 6 in order to assess absolute performance of the robotic cleaning system and its components as well as performance of the robotic system relative to other robotic systems in the same solar park.

The stages of the method depicted in FIG. 3 are also easily implemented on the motors or any other system or component of the robotic solar panel cleaning system, in addition to or instead of the battery as explained in the flow chart.

More specifically, the first stage 110 in the method is to collect life expectancy of the battery of the robotic solar panel cleaning system (again, the battery is merely an example of a component of the solar panel cleaning system identified for the purpose of explaining the method and a system that implements the method and the invention is in no way limited to recommending a maintenance window or replacement of a battery). This information may be stored by an authorized user using a user interface to interact with the processor 7.

Then, in stage 112 during use, battery information is collected on a periodic basis, e.g., hourly. This information may include, as mentioned above, the minimum charge time, the maximum charge time, the average charge time, and the battery charge level. The information is collected by the clients 2 or sensors associated therewith and forwarded via the master control unit 1 to the server 8. From one or more items of the collected information, the remaining life expectancy of the battery is calculated.

Weather information is also collected in stage 114, e.g., on an hourly basis. This weather information may be from external sensors 3 or external weather feeds 9 (see FIG. 1). The information collected by external sensors 3 is forwarded via the master control unit 1 to the server 8. As mentioned above, the sensors may include a visibility sensor that can provide information as to whether, for example, there are clouds in the sky or the sky is clear. Weather information may be collected in stage 114 at the same time as, before and/or after battery information is collected in stage 112.

In stage 116, the battery charge time (x) and level (y) relative to historical behavior of the same battery and relative to batteries of other similar, solar panel cleaning systems in the solar park are calculated, e.g., by processor 7 of server 8 (see FIG. 1). The historical information may be accessed from the database 6 coupled to the processor 7.

The following determinations are provided as examples of conditions that define the parameters for recommending maintenance or replacement of a battery. Other conditions may be used in the invention.

In stage 118, a determination is made whether the charge time for each battery is greater than 4 hours for three consecutive days. If not, it is considered that there is no deviation from the normal, standard charge time of any of the batteries by the respective solar panel(s), and the method returns to stage 112. If there is a deviation, i.e., the charge time for one or more of the batteries from solar energy is greater than 4 hours for three consecutive days, then in stage 120, a determination is made whether the charge time for any such battery deviates from the charge time of the batteries of the other solar panel cleaning systems in the same solar park or installation. If so, this is likely indicative of that single battery being near its end of effective service life, i.e., the battery charging deviates from normal, and in stage 122, the end user 10 is sent a recommendation to replace that specific battery. This recommendation may be generated by the processor 7 and sent to the end user 10 via the internet 5 and an antenna 4 in a manner described above (see FIG. 1). The process then returns to stage 112 for further scheduled collection of battery information.

If all of the battery charge times deviate from the normal, this may be more likely indicative of an issue with the solar panels, i.e., an environmental factor. In stage 124, a determination is made by the processor 7 whether the visibility is less than 100 meters (from the weather information collected in stage 114). If so, this is likely indicative of, for example, a dust storm that has affected all of the solar panels and their ability to charge the respective batteries. In this case, in stage 126, the end user 10 is sent a recommendation to schedule cleaning of the solar panels by the solar panel cleaning systems. This recommendation may be generated by the processor 7 and sent to the end user 10 via the internet 5 and an antenna 4 in a manner described above (see FIG. 1). The process then returns to stage 112 for further scheduled collection of battery information.

If visibility is not determined to be less than 100 meters in stage 124, then a determination may be made in stage 128 whether the sky is cloudy which would also affect the charge time of the batteries by the solar panels. If so, in stage 130, the end user 10 is sent a recommendation or notification that the charging time is slower than usual as a result of clouds, and not as a result of any technical problem with the batteries. The end user 10 may also be sent a recommendation to temporarily increase the charging time. The process then returns to stage 112 for further scheduled collection of battery information.

If it is determined in stage 128 that the sky is not cloudy, then a determination is made in stage 132 whether the remaining life expectancy of the battery is less than 50% of the stored life expectancy (50% being a parameter set by the user in stage 110). If so, the processor 7 generates a recommendation to send to the end user 10 that the battery completed over 50% of its life cycle and should be replaced during the next scheduled maintenance window in stage 134. The process then returns to stage 112 for further scheduled collection of battery information.

Otherwise, a negative determination is indicative of accelerated deterioration of the battery and/or a potential fault in the battery, and a recommendation is sent in stage 136 to the end user 10 to replace the battery ahead of schedule. The recommendation may also include a prompt to check the batteries of the other solar panel cleaning systems to ensure that no other batteries are also experiencing the same fault. The process then returns to stage 110. As another example of the manner in which the system described with reference to FIG. 1 and the methods described with respect to FIGS. 2 and 3 may be used, the invention may be used to optimize the frequency of replacement of transmission belts of the solar panel cleaning systems via machine learning.

Each robotic solar panel cleaning system typically includes a plurality of transmission belts, for example, five (hereinafter the "belts"). For the sake of this example, it will be assumed that maintenance of the belts include either a checkup or a replacement. In the event of a broken belt, the robotic cleaning system reports the incident to the master control unit 1, which transfers the information to the server 8 and stores the incident in the database 6.

The invention is designed to minimize the maintenance cost, the equivalent of the checkup and replacement cost of the belts, which is a function of labor, transportation to the solar park (in many cases, it is located in remote places) and the component cost.

The life expectancy of the belts varies as a function of number of cleaning cycles, hours of operation and many environmental variables such as maximum, minimum and average daily temperatures, topography of the site, etc. The server 6 has the database 6 that stores all the collected data and the processor 7 that enables detection of correlations among environmental variables, such as temperature volatility to life expectancy per belt.

In order to sustain a fail-safe system, the objective of the maintenance cost minimization is under a constraint of having no more than x % broken belts per year, which will negatively impact the reliability of the daily cleaning operation and can lead to significant indirect costs (x being a parameter set by the user). Moreover, a penalty function can be generated to handle the maintenance cost minimization. A general nonlinear programming problem can be formulated to solve the objective function.

For use, during the first year after installation of the robotic cleaning systems, the focus of the server 8 is to formulate a learning curve, i.e., obtain baseline data for later obtained data to be compared to. In order to ensure a fail-safe system that does not exceed the maximum x % broken belts per year constraint, the server learning process will be initiated with an instruction to recommend a belt checkup and replacement 10 times and 5 times, respectively, during the life expectancy of the belt. That is, assuming a belt with a life expectancy of 30 months, the server 8 will initially recommend a checkup and replacement every 3 and 6 months, respectively.

As a function of time, after building a database with statistically significant correlations, the processor 7 might reduce the penalty of the broken belt constraint, which, in turn, will lead to longer durations between belt checkup and replacement until the system reaches the optimal position. The optimal frequency changes from year to year as a function of weather, changes from one solar park to the other as a function of topography and solar row lengths and changes between clients (the system might much more risk averse with a new customer than a long satisfied customer and will, therefore, imply a higher penalty on the broken belt constraint of a new customer vs. an existing one).

As previously mentioned in the description of FIG. 3, the goal is to provide timely recommendations to the end user 10 and manage, optimize and simplify the maintenance process that the end user 10 is directed to undertake via recommendations made by the algorithm being executed in the server 8. The following examples illustrate some possible pattern detection by the processor 7 in the server 8 and recommendations:

1. The processor 7 determines that over the last 6 months, it has generated recommendations to the end user 10 to replace the transmission belts twice and none of the belts broke. According to the historical patterns in the database 6, the temperature level and volatility for the past six months stood at 30 year high and in light of the upcoming winter, the temperature is expected to be mild. If, for example, the processor 7 estimates that according to current patterns and weather conditions, the expected meantime between failure (MTBF) stands at 3 years and the probability of 1 or more broken belts over the next 6 months stands at 0.01%, it could recommend to extend the next replacement date and, by so doing, save replacement costs without jeopardizing reliability.

2. The processor 7 detects a 5% broken belt rate from a similar batch. As such, the system will alert the authorized user 10 about a possible faulting batch of belts. The 5% threshold may be adjusted or set by the user interacting with the server 8.

3. The processor 7 makes recommendations that are not converted to actual actions by the end user 10. This may be determine by the processor 7 monitoring the components of the cleaning system and detecting changes thereto, and its conditions for making the determinations relating to maintenance matters and detecting changes thereto. In such cases, the processor 7 will learn from its past mistakes, e.g., a recommended belt replacement was not effected, and will adjust accordingly. For example, the processor 7 may realize that over the last three years, it generated recommendations to check the belts in the winter.

In this regard, the recommendations made by the processor 7 may be stored in the database 6 along with the condition underlying each recommendation and the status of whether the recommendation was effected or not. This is part of the historical record in the database 6 available to the processor 7 when considering generating a recommendation based on current conditions of the cleaning system.

If the user declines the recommendation multiple times, the processor 7 will learn not to make such a recommendation in the future. In the event, the processor 7 recognizes that the user has accepted such recommendations under specific circumstances (i.e., after multiple incidents of broken belts), the processor 7 will adjust its recommendation algorithm accordingly and will enrich the trend analysis with situational conditions under which the probability of future acceptance of recommendations increases.

The foregoing system and method enables the present invention to accurately predict maintenance windows as well as determine the optimal cleaning time on a daily basis. Advantages of such a system and method are that they are cost effective, improve reliability, efficiency and significantly reduce the downtime and recurring maintenance costs of solar panel robotic cleaning systems.

Although the arrangement of software and communication components described above has been found useful and effective in implementing the functionality that is described herein, other arrangements (e.g., using GPS instead of RF, mesh topology instead of star topology, etc.) will be apparent to those skilled in the art and are considered to be within the scope of the present invention.

The foregoing disclosed structure provides for automated machine learning for predictive maintenance and optimization of solar park efficiency utilizing multiple sources, feeds and sensors. By applying machine learning, it is intended that the processor 7, or more generally the server 8, is able to learn from one or more sources of knowledge about the robotic cleaning systems in the solar park, for example, the history of the operation of the solar park, the response by the end user 10 to recommendations regarding maintenance and servicing of the cleaning systems or components thereof. This knowledge is then applied and considered when the processor 7 is formulating a current recommendation for maintenance or servicing.

Moreover, it is to be understood that the present invention is not limited to the embodiments described above, but includes any and all embodiments within the scope of the following claims. While the invention has been described above with respect to specific apparatus and specific implementations, it should be clear that various modifications and alterations can be made, and various features of one embodiment can be included in other embodiments, within the scope of the present invention. It is to be understood that the present invention is not limited to the embodiments.

The invention claimed is:

1. A method for controlling maintenance or a cleaning cycle of a robotic system that cleans solar panels, comprising:
    obtaining operational data about the robotic system;
    obtaining environmental data relating to an area of the solar panels;
    determining, using a processor, a recommendation for control or maintenance of the robotic system based on the obtained operational data and the obtained environmental data; and
    outputting the recommendation to an authorized user,
    whereby the recommendation includes initiating a maintenance or cleaning cycle by the robotic system of the solar panels, terminating a pre-scheduled maintenance or cleaning cycle by the robotic system of the solar panels, adjusting a pre-scheduled maintenance or cleaning cycle by the robotic system of the solar panels, providing an explanation of operational performance of the robotic system that deviates from normal, directing replacement of a component of the robotic system ahead of schedule or directing replacement of a component of the robotic system during its next, scheduled maintenance.

2. The method of claim 1, further comprising:
receiving input at the processor from the user in response to the recommendation; and
adjusting, using the processor, subsequent recommendations based on a learning process of the authorized user's input.

3. The method of claim 1, wherein the step of obtaining environmental data relating to the area of the solar panels comprises obtaining, using a wind sensor situated in the area of the solar panels, data relating to wind speed.

4. The method of claim 1, wherein the step of obtaining environmental data relating to the area of the solar panels comprises obtaining, using a humidity sensor situated in the area of the solar panels, data relating to humidity.

5. The method of claim 1, wherein the step of obtaining environmental data relating to the area of the solar panels comprises obtaining, using a visibility sensor situated in the area of the solar panels, data relating to visibility.

6. The method of claim 1, wherein the step of obtaining environmental data relating to an area of the solar panels comprises receiving at the processor, environmental data from at least one external source of weather information.

7. The method of claim 1, wherein the step of obtaining operational data about the robotic system comprises obtaining information about a time to charge a battery of the robotic system, a minimum charge level of the battery, and a maximum charge level of the battery.

8. The method of claim 1, further comprising storing, in a database accessible to the processor, historical data about operation of the robotic system, a recommendation being determined by the processor only when the operational data deviates from normal operational data as obtained from the historical data in the database.

9. A method for controlling maintenance or a cleaning cycle of a plurality of robotic systems that clean solar panels in a common solar park, comprising:
obtaining operational data about each of the robotic systems using sensors associated with the robotic systems;
obtaining environmental data relating to an area of the solar park using environmental sensors;
collecting the operational data and environmental data at periodic intervals;
for each collection of operational data and environmental data at a periodic interval,
determining, using a processor, whether a component of each robotic system is experiencing an operational deviation for a predetermined period of time, and only if so,
determining, using a processor, whether the same component of other robotic systems is experiencing the same operational deviation,
if not, outputting a recommendation to an authorized user that the component of the robotic system should be replaced,
if so, determining whether an environmental factor is causing the operational deviation and if so, outputting a recommendation to the authorized user that changing of the operation of the robotic system should be undertaken, and if not, outputting a recommendation to the authorized user that the component of the robotic system should be replaced before a scheduled replacement if the remaining life expectancy of the component is less than a threshold of stored life expectancy of the component.

10. A system for controlling maintenance or a cleaning cycle of a robotic system that cleans solar panels, comprising:
a master control unit that obtains operational data about the robotic system; and
a server coupled to said master control unit and that obtains environmental data relating to an area of the solar panels and determines a recommendation for control or maintenance of the robotic system based on the operational data obtained by said master control unit and the obtained environmental data, said server being configured to output the recommendation to an authorized user,
whereby the recommendation includes initiating maintenance or a cleaning cycle by the robotic system of the solar panels, terminating a pre-scheduled maintenance or cleaning cycle by the robotic system of the solar panels, adjusting a pre-scheduled maintenance or cleaning cycle by the robotic system of the solar panels, providing an explanation of operational performance of the robotic system that deviates from normal, directing replacement of a component of the robotic system ahead of schedule or directing replacement of a component of the robotic system during its next, scheduled maintenance.

11. The system of claim 10, wherein said server is further configured to assess response by the user to the recommendation and adjust subsequent recommendations based on a learning process of the authorized user's response to earlier provided recommendations.

12. The system of claim 10, further comprising a wind sensor situated in the area of the solar panels, said wind sensor obtaining data relating to wind speed and providing the data to said server via said master control unit.

13. The system of claim 10, further comprising a humidity sensor situated in the area of the solar panels, said humidity sensor obtaining data relating to humidity and providing the data to said server via said master control unit.

14. The system of claim 10, further comprising a visibility sensor situated in the area of the solar panels, said visibility sensor obtaining data relating to visibility and providing the data to said server via said master control unit.

15. The system of claim 10, wherein said server is configured to obtain environmental data relating to an area of the solar panels directly from at least one source of weather information.

16. The system of claim 10, wherein the operational data obtained by said master control unit includes a time to charge a battery of the robotic system, a minimum charge level of the battery, and a maximum charge level of the battery.

17. The system of claim 10, wherein sad server includes a database in which historical data about operation of the robotic system is stored, said server being configured to determine a recommendation only when the operational data deviates from normal operational data as obtained from the historical data in said database.

* * * * *